United States Patent
Simoncini et al.

(10) Patent No.: US 10,762,725 B2
(45) Date of Patent: Sep. 1, 2020

(54) AUTOMATIC CLASSIFICATION OF INACTIVE VEHICLE TRACKING UNIT

(71) Applicant: Verizon Connect Ireland Limited, Sandyford Dublin (IE)

(72) Inventors: Matteo Simoncini, Pistoia (IT); Luca Bravi, Scandicci (IT); Samuele Salti, Prato (IT); Leonardo Taccari, Florence (IT); Francesco Sambo, Florence (IT); Alessandro Lori, Florence (IT); Leonardo Sarti, Sesto Fiorentino (IT); Andrea Benericetti, Prato (IT); Stefano Caprasecca, Florence (IT)

(73) Assignee: Verizon Connect Ireland Limited, Dublin (IE)

( * ) Notice: Subject to any disclaimer, the term of this patent is extended or adjusted under 35 U.S.C. 154(b) by 0 days.

(21) Appl. No.: 16/242,592

(22) Filed: Jan. 8, 2019

(65) Prior Publication Data
US 2020/0219333 A1 Jul. 9, 2020

(51) Int. Cl.
*H04W 4/42* (2018.01)
*H04W 4/44* (2018.01)
*G07C 5/00* (2006.01)
*G01S 5/00* (2006.01)
*G08G 1/00* (2006.01)

(52) U.S. Cl.
CPC ............ *G07C 5/008* (2013.01); *G01S 5/0027* (2013.01); *G08G 1/20* (2013.01)

(58) Field of Classification Search
CPC .................... H04W 4/00–046; H04W 4/38–48
See application file for complete search history.

(56) References Cited

U.S. PATENT DOCUMENTS

| 2010/0097208 | A1* | 4/2010 | Rosing | G06Q 10/087 340/539.13 |
| 2014/0226010 | A1* | 8/2014 | Molin | G06Q 10/06 348/148 |
| 2017/0150442 | A1* | 5/2017 | Cawse | H04W 52/0216 |

OTHER PUBLICATIONS

Chandola, et al., "Anomaly Detection: A Survey", To Appear in ACM Computing Surveys, Sep. 2009, pp. 1-72.
Gao, et al., "A Survey of Fault Diagnosis and Fault-Tolerant Techniques—Part I: Fault Diagnosis With Model-Based and Signal-Based Approaches", IEEE Transactions on Industrial Electronics, vol. 62, No. 6, p. 3757-3767, Jun. 2015.
Guo, et al., "A hybrid feature model and deep learning based fault diagnosis for unmanned aerial vehicle sensors", Neurocomputing 319 (Sep. 1, 2018) 155-163.

(Continued)

*Primary Examiner* — San Htun

(57) ABSTRACT

A device can receive message data associated with a vehicle tracking unit (VTU). The device can identify, based on the message data, the VTU as an inactive VTU. The device can compute a feature vector, associated with the VTU, based on the message data and on environmental data associated with the VTU. The feature vector can be computed based on identifying the VTU as an inactive VTU. The device can determine, using an inactivity classification model, an inactivity classification associated with the VTU. The inactivity classification can be determined based on providing the feature vector, associated with the VTU, as an input to the inactivity classification model. The device can cause an inactivity action to be performed based on the inactivity classification.

20 Claims, 11 Drawing Sheets

(56) References Cited

OTHER PUBLICATIONS

Liu, et al., "Sensor Fault Diagnosis of GPS/INS Tightly Coupled Navigation System Based on State Chi-square Test and Improved Simplified Fuzzy Artmap Neural Network", Proceedings of the 2017 IEEE International Conference on Robotics and Biomimetics, pp. 2527-2532, Dec. 5-8, 2017, Macau SAR, China.

Qin, "Survey on data-driven industrial process monitoring and diagnosis", Annual Reviews in Control 36 (Oct. 26, 2012) 220-234.

Best Available Date: Jun. 18-20, 2017, Wang, et al., "GNSS Receiver Autonomous Integrity Monitoring Algorithm Based on Least Squared Method", 2017 12th IEEE Conference on Industrial Electronics and Applications (ICIEA), pp. 2017-2021, Jun. 18, 2017.

Wen, et al., "A New Convolutional Neural Network-Based Data-Driven Fault Diagnosis Method", IEEE Transactions on Industrial Electronics, vol. 65, No. 7, pp. 5990-5998, Jul. 2018.

Bravi, et al., "Fault detection in non-reporting Vehicle Tracking Units", Presented at ITSC 2019 conference on Oct. 27, 2019, Best Available Date: Oct. 27-30, 2019.

Li, et al., "Multimodal deep support vector classification with homologous features and its application to gearbox fault diagnosis", Neurocomputing 168 (Jun. 16, 2015) 119-127.

\* cited by examiner

FIG. 2A

*DEVICE STATUS*

Vehicle 5

Vehicle 5 has not reported in the last 7 days and showed an anomalous behavior before shutdown.

The vehicle has been driven in this period, help me solve the issue with customer support    [Select]

The VTU has been disconnected (e.g., vehicle under repair or no longer used)    [Select]

The vehicle has been parked during the entire period and the VTU has no issues    [Select]

Other    [Select]

[Dismiss]

FIG. 2B

*VEHICLE NOT REPORTING*

Vehicle 5

Customer care team is investigating. How would us to contact you?

Name: John Doe

● Email    jdoe@email.com
○ Phone

[Dismiss]    [Send]

FIG. 5A

*DEVICE STATUS*

Vehicle 5

Vehicle 5 has not reported in the last 7 days and showed an anomalous behavior before shutdown.

The vehicle has been driven in this period, help me solve the issue with customer support — Select The VTU has been disconnected (e.g., vehicle under repair or no longer used) — Select The vehicle has been parked during the entire period and the VTU has no issues — Select Other Dismiss

FIG. 5B

*VEHICLE NOT REPORTING*

Vehicle 5

Please describe the issue in the form below

Thank you for your feedback.

Dismiss    Send

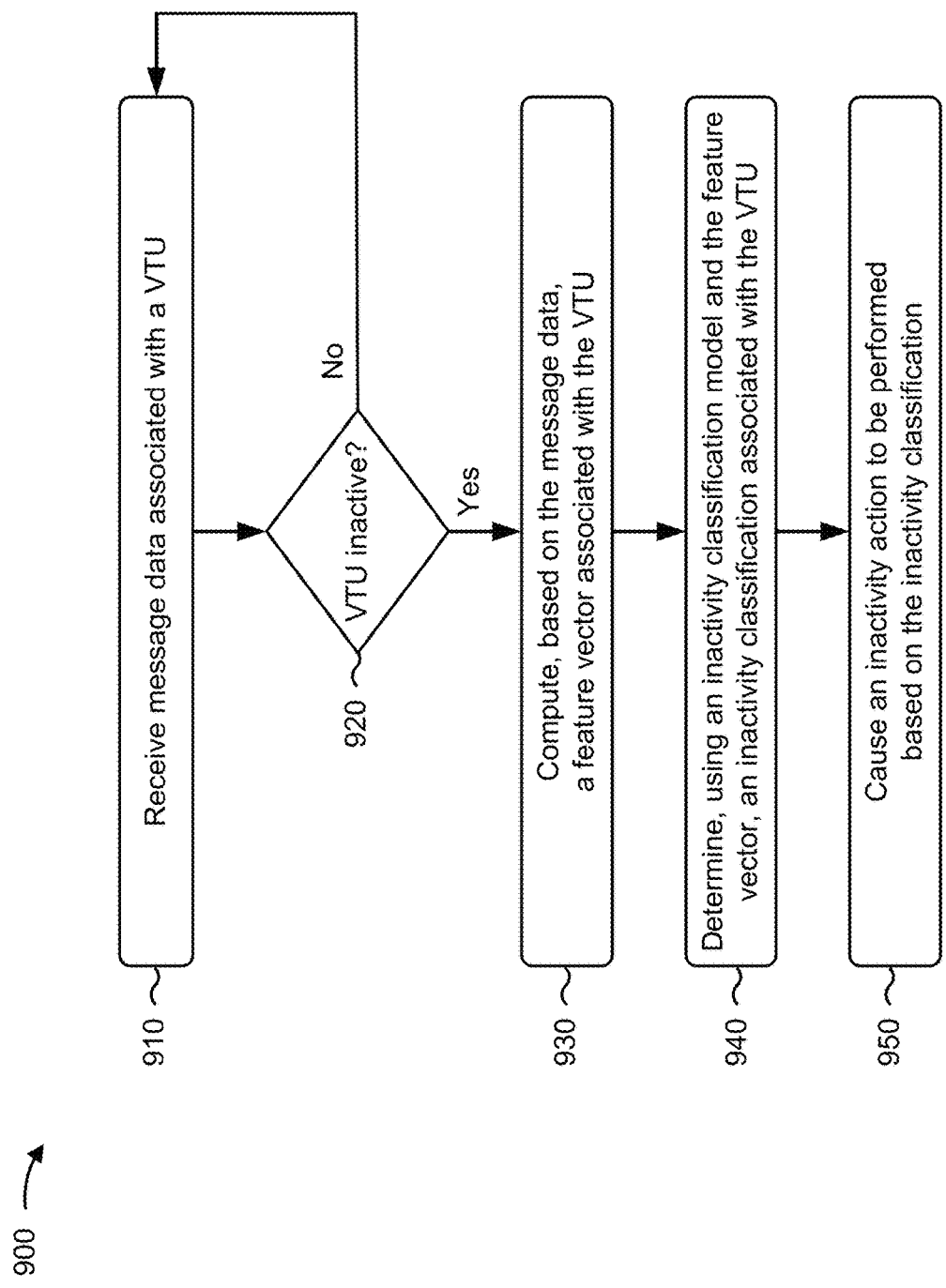

US 10,762,725 B2

AUTOMATIC CLASSIFICATION OF INACTIVE VEHICLE TRACKING UNIT

BACKGROUND

A vehicle tracking unit (VTU) is a device configured on a vehicle. In operation, the VTU periodically transmits (e.g., via a cellular network) messages, each typically including information that identifies a current location of the vehicle. The VTU can also be capable of transmitting other information associated with the VTU and/or the vehicle, such as activity information, status information, diagnostic information, and/or the like.

BRIEF DESCRIPTION OF THE DRAWINGS

FIGS. 2A, 2B, 3A, 3B, 4A, 4B, 5A, and 5B are diagrams of example user interfaces via which a classification platform can receive feedback associated with an inactivity classification of a vehicle tracking unit.

FIG. 9 is a flow chart of an example process for determining an inactivity classification, associated with an inactive VTU, using an inactivity classification model.

DETAILED DESCRIPTION OF PREFERRED EMBODIMENTS

Figure 1A:
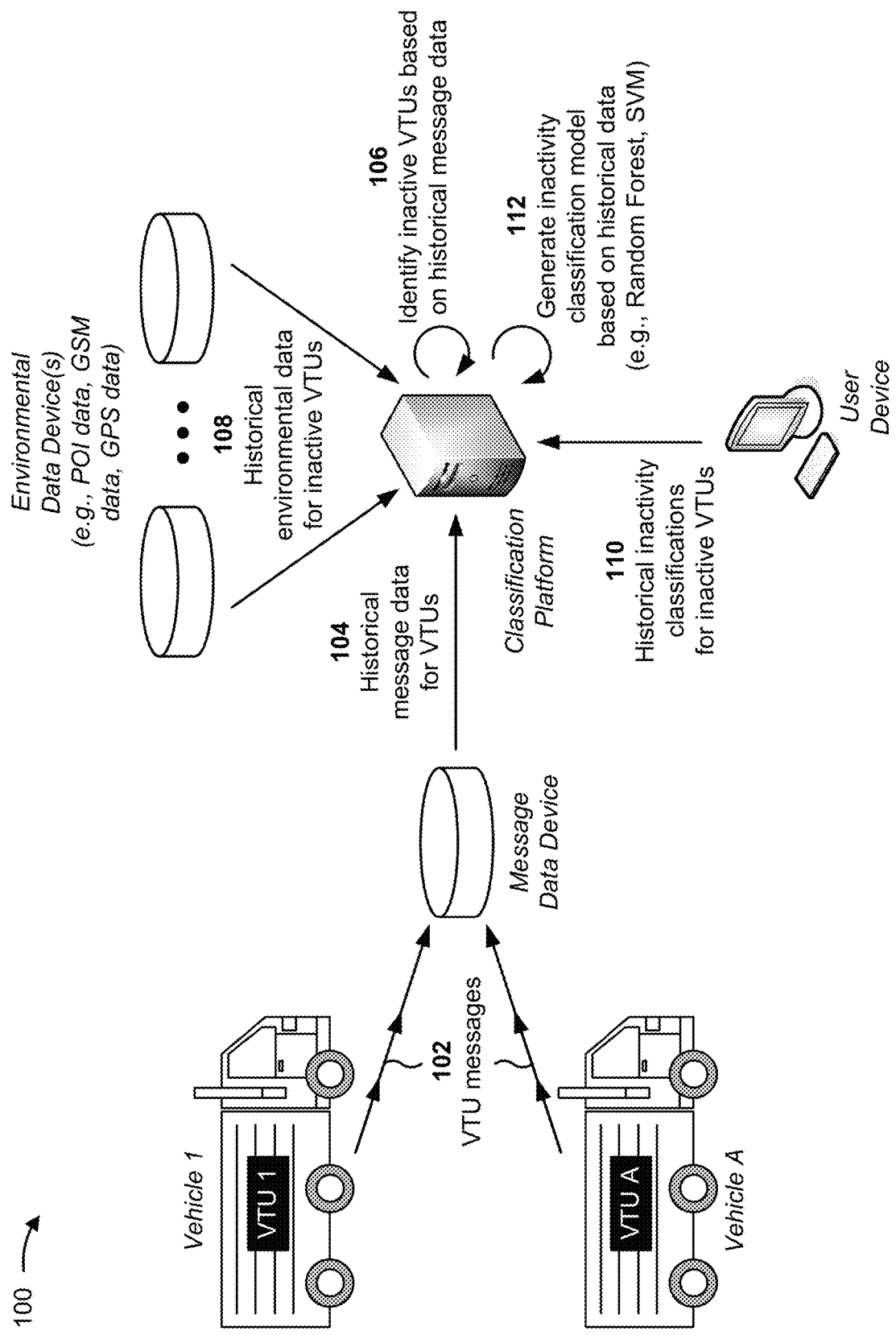
FIGS. 1A-1C are diagrams of an example implementation described herein.

The following detailed description of example implementations refers to the accompanying drawings. The same reference numbers in different drawings can identify the same or similar elements.

As described above, a VTU can transmit messages associated with a vehicle and/or the VTU itself. A given message typically includes location information that identifies a location of the vehicle at a given time. The location information can include, for example, a set of global positioning system (GPS) coordinates, a latitude and a longitude, a timestamp associated with the location, and/or the like. The message can also include one or more other types of information. For example, the message can include activity and status information associated with the vehicle, such as an engine status signal (e.g., an indication of whether an engine of the vehicle is powered on or powered off), an indication of an occurrence of an event (e.g., an instance of harsh braking of the vehicle, an instance of speeding of the vehicle, and/or the like), and so on. As another example, the message can include diagnostic information associated with the VTU, such as an indication of a battery power level of the VTU, an indication of signal quality associated with the location information (e.g., a GPS signal quality), an indication of signal quality associated with a communication network via which the message is sent (e.g., a cellular network signal quality), and/or the like.

In some cases, the VTU can transmit messages at particular intervals of time, which can vary across VTUs depending on, for example, a type of the VTU, a working mode of the VTU (e.g., active, light sleep, deep sleep, and/or the like), and/or another characteristic of the VTU. In some cases, each message can include an indication of the type of the VTU, the working mode of the VTU, and/or the like.

Further, in some cases, the time interval at which a VTU transmits messages varies for a given application. For instance, in a fleet management application, a typical message transmission time interval can be on the order of minutes (e.g., every minute, every two minutes, and/or the like) when the VTU is working in an active mode (e.g., a mode of VTU operation when the vehicle is powered on). However, the message transmission time interval can be on the order of hours (e.g., every four hours, every eight hours, and/or the like) when the VTU is operating in a light sleep mode (e.g., a mode of VTU operation when the vehicle has been powered off for a few hours or a few days), and the VTU may not send any messages when the VTU is operating in a deep sleep mode (e.g., a mode of VTU operation when the vehicle has been powered off for a threshold period of time, when a battery power level is at or below a threshold, and/or the like). Typically, a given message is received at a message data storage device, which stores the message and/or provides information associated with the message for use in, for example, fleet management software associated with monitoring the location and status of a fleet of vehicles.

In practice, a VTU is exposed to adverse working conditions, such as high temperatures, low temperatures, vibration, contamination, and/or the like, which can cause the VTU to malfunction and become inactive and, therefore, stop transmitting messages. Such a malfunction can occur, for example, because the VTU has experienced a fault or has been disconnected from a power supply (e.g., due to vibration, due to battery death, and/or the like). A malfunction can also occur without such a hardware issue. For example, the VTU can experience a malfunction (and become inactive) due to the vehicle being located in an area in which there is little or no network connectivity, due to the VTU being manually unplugged, and/or the like. A malfunctioning VTU is herein referred to as an anomalous non-reporting unit (ANR). Unfortunately, from the perspective of fleet management, distinguishing between an ANR and a VTU that is inactive for a legitimate reason (e.g., because the VTU is operating in the deep sleep mode) is challenging.

Some implementations described herein provide a classification platform capable of determining, using an inactivity classification model, an inactivity classification associated with an inactive VTU. In some implementations, the inactivity classification indicates that the VTU has been classified as an ANR or that the VTU has been classified as a normal inactive unit (i.e., that the VTU is inactive for a legitimate reason rather than a result of a malfunction).

In some implementations, the inactivity classification is determined based on providing a feature vector, associated with the VTU, as an input to the inactivity classification model, as described below. In some implementations, the classification platform can cause an inactivity action to be performed based on the inactivity classification, as described below. In some implementations, the classification platform can generate the inactivity classification model based on historical message data associated with a group of VTUs (which may or may not include the VTU), as described below.

Determining an inactivity classification of an inactive VTU in the manner described herein (e.g., using the classification platform) addresses the technical challenge of differentiating malfunctioning VTUs (i.e., ANRs) from VTUs having normal inactivity in a vehicle monitoring system. The determination of the inactivity classification is necessarily rooted in technology in order to overcome a problem specifically arising in the realm of VTUs being connected to a vehicle monitoring system via a network.

Further, the techniques for inactivity classification described herein allow a plurality of features, associated with an inactive VTU, to be taken into account at the same time when classifying the inactive VTU in an efficient manner that allows ANRs to be efficiently identified by the classification platform. As a result, the inactivity classification techniques described herein decrease processing time and resources used to identify ANRs, and improve the delivery of the vehicle monitoring services.

Additionally, the inactivity classification techniques described herein provide a specific solution (e.g., determining an inactivity classification based on a feature vector associated with an inactive VTU and using an inactivity classification model), which improves efficiency of classifying an inactive VTU and, therefore, conserves computing resources. Furthermore, the classification platform generates user interfaces which can provide information relevant to operations to be performed by a technician associated with the vehicle monitoring system, information relevant to vehicle monitoring, and/or the like. Thus, computing resources are conserved that would otherwise be used to obtain or compile this information. In this way, the classification platform described herein provides a specific solution to an existing technical problem associated with inefficient usage of computing resources in vehicle monitoring systems.

Additionally, the inactivity classification techniques described herein, by pre-emptively performing an action (e.g., notifying a user of a possible issue), increases utilization of fleet resources and increases user satisfaction, while reducing resource consumption that would otherwise be required for customer and/or hardware support in order to diagnose and address VTU issues. As a result, the inactivity classification techniques described herein decrease processing time and resources used to identify ANRs, and improve the delivery of the vehicle monitoring services.

Further, the inactivity classification techniques described herein, by batch processing VTU data, allow large-scale VTU issues to be identified (e.g., issues caused by improper VTU installation, system-wide updates to a firmware version or configuration, and/or the like). As a result, the inactivity classification techniques described herein improve the delivery of the large-scale vehicle monitoring services.

Figure 1B:
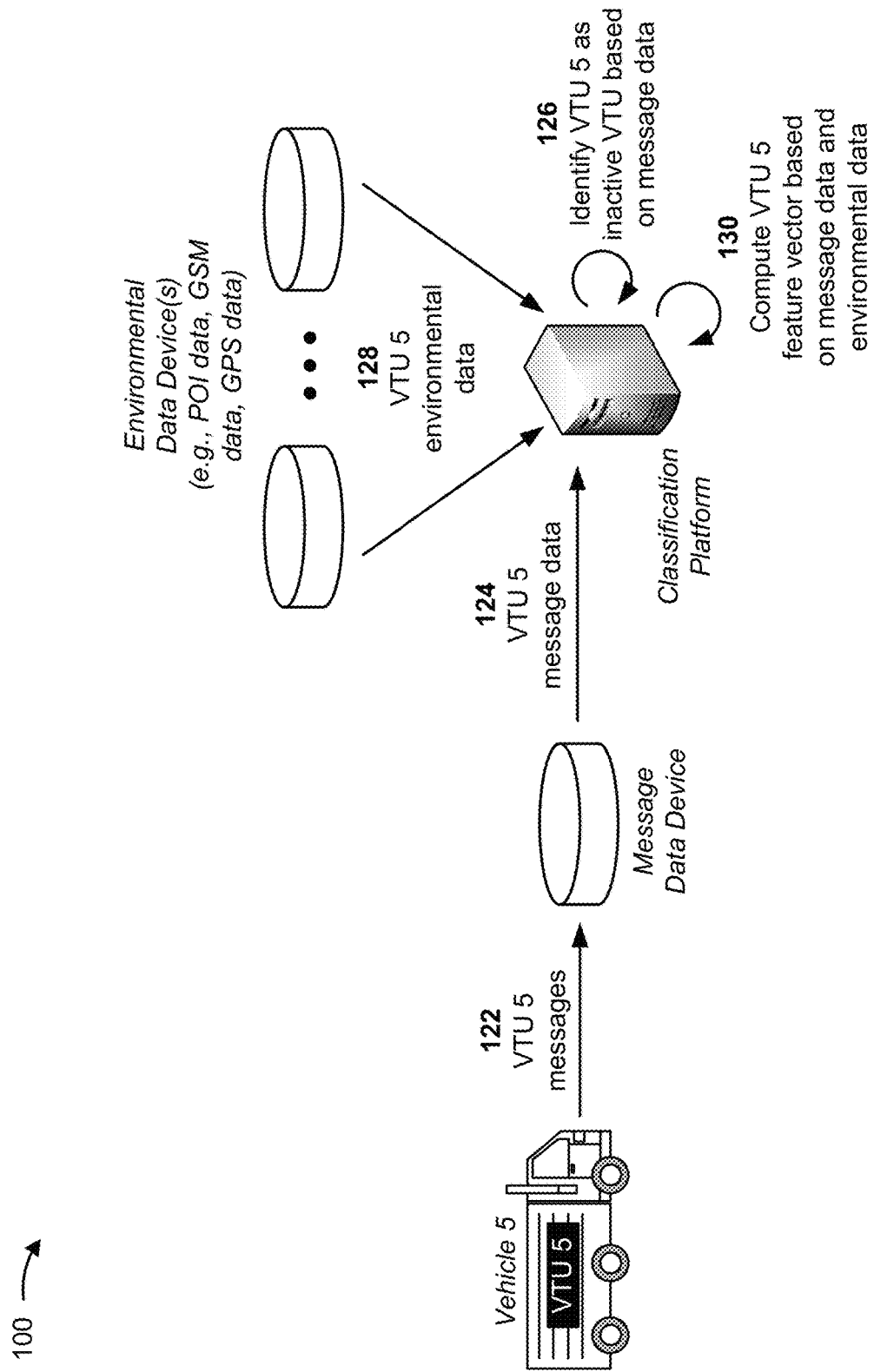
Figure 1C:
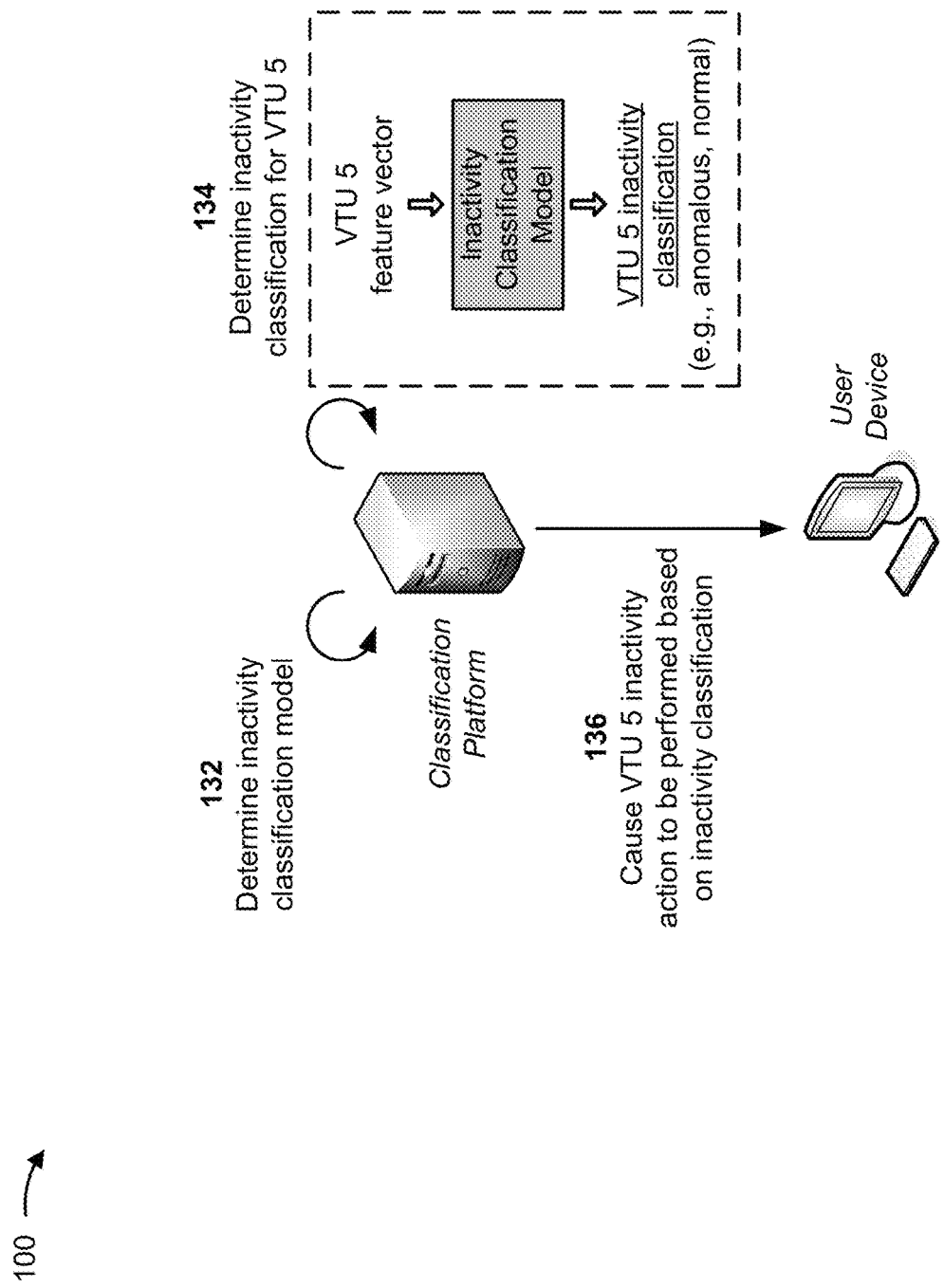

FIGS. 1A-1C are diagrams of an example implementation 100 described herein. As shown in FIG. 1A, a set of vehicles (e.g., vehicle 1 through vehicle A (A≥1)) are each configured with a respective VTU (e.g., VTU 1 through VTU A). As shown by reference number 102, each of the set of VTUs can transmit messages to a message data device.

In some implementations, a given message transmitted by a given VTU can include location information associated with a vehicle (e.g., a set of GPS coordinates, a latitude and a longitude, a timestamp, and/or the like), activity and status information associated with the vehicle (e.g., an engine status signal, an indication of an occurrence of an event, and/or the like), diagnostic information associated with the VTU (e.g., an indication of a battery power level of the VTU, an indication of signal quality associated with the location information, an indication of signal quality associated with a network via which the message is sent, and/or the like) and/or one or more other types of information, as described above.

In some implementations, the message data device can be a device capable of receiving and storing messages received from the set of VTUs over time, such that the message data device stores historical message data associated with the set of VTUs. In some implementations, the message data device stores an association between a given message and a VTU that transmitted the given message (e.g., such that messages transmitted by the VTU can be identified at a later time). For example, the message data device can store information associating the given message and an identifier (e.g., a VTU identification number) corresponding to the VTU that transmitted the given message.

In some implementations, a classification platform can generate an inactivity classification model based in part on the historical message data. The inactivity classification model is a model that receives, as an input, a feature vector associated with an inactive VTU and provides, as an output, an inactivity classification, associated with the inactive VTU, that indicates that the VTU has been classified as an ANR (i.e., that the VTU is inactive due to a malfunction) or that the VTU has been classified as a normal inactive unit (i.e., that the VTU is inactive for a legitimate reason and not due to a malfunction). An example implementation of generating the inactivity classification model is provided in FIG. 1A, and an example implementation associated with using the inactivity classification model is described below in FIGS. 1B and 1C.

As indicated in FIG. 1A, in some implementations, the classification platform generates the inactivity classification model based on historical message data associated with a set of historically inactive VTUs, historical environmental data associated with the set of historically inactive VTUs, and historical inactivity classifications associated with the set of historically inactive VTUs.

The historical message data includes, for example, information included in messages provided by a set of VTUs, as described above. In some implementations, as shown by reference number 104, the classification platform receives the historical message data from the message data device. For example, the classification platform can receive (e.g., based on user input) an indication that classification platform is to generate the inactivity classification model, can request the historical message data (e.g., historical message data for a most recent year, a most recent month, and/or the like), and can receive the historical message data from the message data device in response to the request. In some implementations, the historical message data can include message data received during a particular period of time. For example, the historical message data can include message data provided by the set of VTUs during a most recent 14 days, a most recent month, and/or the like. In some implementations, the period of time can be configurable and/or selectable on the classification platform.

In some implementations, as shown by reference number 106, the classification platform can identify a set of historically inactive VTUs among the set of VTUs associated with the historical message data. In some implementations, the set of historically inactive VTUs includes VTUs that are currently inactive and/or VTUs that were previously inactive (e.g., VTUs that were inactive but have since been returned to an active state).

In some implementations, the classification platform can identify the set of historically inactive VTUs based on the historical message data. For example, the classification platform can identify inactive periods of each of the set of VTUs (e.g., periods of time during which no messages were received from the VTU). Here, the classification platform can determine whether a length of a given inactive period satisfies a threshold (e.g., one day, three days, a week, and/or the like). For a given VTU, if the length of at least one inactive period satisfies the threshold (e.g., if a message was not received from the VTU for an amount of time that meets or exceeds the threshold), then the classification platform can identify the given VTU as a historically inactive VTU. Conversely, if no inactive period satisfies the threshold, then the classification platform may not identify the given VTU as a historically inactive VTU.

As further shown in FIG. 1A, and by reference number 108, the classification platform can determine historical environmental data associated with the set of historically inactive VTUs. The historical environmental data can include information that describes a characteristic of an environment in proximity to (e.g., within a threshold distance) a location from which a historically inactive VTU transmitted before becoming inactive. For example, the historical environmental data can include information indicating the presence of a point of interest included in an environment of the historically inactive VTU. The point of interest can be, for example, a vehicle repair facility within a threshold distance (e.g., two kilometers (km), five km, and/or the like) of the historically inactive VTU, a VTU repair facility within the threshold distance of the historically inactive VTU, and/or another type of location. As another example, the historical environmental data can include information that describes network coverage conditions (e.g., an expected cellular network signal quality, a measured cellular network signal quality, and/or the like) in the environment of the historically inactive VTU. As another example, the historical environmental data can include information that describes location service coverage conditions (e.g., a GPS signal quality) in the environment of the historically inactive VTU.

In some implementations, as shown in FIG. 1A, the classification platform can determine the historical environmental data based on information provided by one or more environmental data devices that store or have access to historical environmental data. For example, the classification platform can identify, based on the historical message data, a last active location of a historically inactive VTU prior to the historically inactive VTU becoming inactive. Here, the classification platform can provide, to the one or more environmental data devices, a request for historical environmental data associated with the identified last active location at a time corresponding to the last active location. The one or more environmental data devices can determine the historical environmental data based on the information that identifies the last active location and the time of the last active location, and can provide the historical environmental data to the classification platform. In some implementations, the classification platform can determine historical environmental data for one or more (e.g., each) of the set of historically inactive VTUs identified by the classification platform.

As a particular example, an environmental data device can store or have access to information that identifies locations of vehicle and/or VTU repair facilities. Here, the environmental data device can, based on a last active location of the historically inactive VTU and an associated timestamp, identify any vehicle and/or VTU repair facilities at or near the last active location of the historically inactive VTU at the associated time, and provide the historical environmental data accordingly.

As another particular example, an environmental data device can store or have access to a historical map of network coverage conditions. Here, based on the last active location of the historically inactive VTU and the associated timestamp, the environmental data device can determine an expected cellular network signal quality at or near the last active location of the historically inactive VTU at the associated time, and provide the historical environmental data to the classification platform accordingly.

As another particular example, an environmental data device can store or have access to a historical map of GPS coverage conditions. Here, based on the last active location of the historically inactive VTU and the associated timestamp, the environmental data device can determine an expected GPS signal quality (or other wireless signal quality) at or near the last active location of the historically inactive VTU at the associated time, and provide the historical environmental data to the classification platform accordingly.

As further shown in FIG. 1A, and by reference number 110, the classification platform can determine a historical inactivity classification for each of the set of historically inactive VTUs. The historical inactivity classification includes an indication of whether a historically inactive VTU, of the set of historically inactive VTUs identified by the classification platform based on the historical message data, was an ANR or a normal inactive unit. In some implementations, the classification platform can determine the historical inactivity classifications based on user input. For example, a user of the user device can indicate, via input to the user device, whether each of the set of historically inactive VTUs was an ANR or a normal activity unit, and the user device can provide an indication to the classification platform, accordingly.

As shown by reference number 112, in some implementations, the classification platform can generate the inactivity classification model based on the historical message data, the historical environmental data, and the historical inactivity classifications. As described above, the inactivity classification model can include a model that receives, as an input, a feature vector associated with an inactive VTU and provides, as an output, an inactivity classification, associated with the inactive VTU, that indicates that the VTU has been classified as an ANR (i.e., that the VTU is inactive due to a malfunction) or that the VTU has been classified as a normal inactive unit (i.e., that the VTU is inactive for a legitimate reason and not due to a malfunction).

In some implementations, the classification platform can generate the inactivity classification model based on a set of historical feature vectors, each associated with a respective one of the historically inactive VTUs. Here, a given historical feature vector includes information that describes one or more features or characteristics of a respective historically inactive VTU. In some implementations, the classification platform can determine a historical feature vector, associated with a historically inactive VTU, based on historical message data and/or historical environmental data associated with the historically inactive VTU. Further description of generating the inactivity classification model is provided below, followed by a description of example feature vectors.

In some implementations, the classification platform can portion the set of historical feature vectors and their associated historical inactivity classifications into a training set (e.g., 75% of the historical feature vectors and their associated historical inactivity classifications) and a validation set (e.g., 25% of the historical feature vectors and their associated historical inactivity classifications), and can train and then validate the inactivity classification model, accordingly.

In some implementations, the classification platform can preprocess and/or perform dimensionality reduction to reduce the historical feature vectors (i.e., the classification platform can perform feature selection), and can train and validate the inactivity classification model using the set of reduced historical feature vectors, thereby reducing processing to train the inactivity classification model.

In some implementations, the classification platform can generate the inactivity classification model based on a supervised machine learning algorithm, such as a random forest, a support vector machine (SVM), and/or the like. The supervised machine learning algorithm can be any algorithm that uses a training set including historical feature vectors and their associated historical inactivity classifications in order to train the inactivity classification model. In some implementations, the inactivity classification model trained using the supervised machine learning algorithm can be validated using a validation set, and can be updated, modified, or retrained as needed.

Additionally, or alternatively, the classification platform can generate the inactivity classification model based on an unsupervised machine learning algorithm, such as a one-class SVM, an isolation forest, and/or the like. The unsupervised machine learning algorithm can be any algorithm that uses a training set that includes historical feature vectors, but not the associated historical inactivity classifications, and is designed to identify outliers among the historical feature vectors in association with classifying a given inactive VTU.

In some implementations, the classification platform can use one or more other model training techniques in order to train the inactivity classification model based on at least the historical feature vectors. Such techniques can include, for example, a neural network technique, a latent semantic indexing technique, and/or the like.

Notably, the examples provided above are not exhaustive and are non-limiting. Generally, the classification platform can use any number of artificial intelligence techniques, machine learning techniques, deep learning techniques, and/or the like to generate the inactivity classification model.

As described above, a feature vector (e.g., a historical feature vector) includes information that describes one or more features or characteristics of an inactive VTU (e.g., a historically inactive VTU). Generally, a feature can include any information associated with an activity history associated with the VTU, an inactivity history associated with the VTU, a message type history associated with the VTU, a reset history of the VTU, an age of the VTU, a voltage statistic associated with the VTU, a most recent message provided by the VTU (e.g., a last message sent before the VTU became inactive), a proximity of a point of interest to the VTU, a cellular signal quality associated with the VTU, a location service signal quality associated with the VTU, and/or the like. The following paragraphs described examples of features that can be included in a given feature vector.

The feature can include, for example, statistical information associated with an activity history of a vehicle associated with the VTU, such as information that identifies a mean, a median, a maximum, a minimum, a standard deviation, and/or the like, of a number of movement-related messages and/or idling-related messages, associated with the vehicle, that were received from the VTU prior to the VTU becoming inactive.

As another example, the feature can include statistical information associated with an inactivity history of the VTU, such as information that identifies a number or a percentage of inactive days in the history of the VTU, a maximum length of a period without any active day, and/or the like. In some implementations, an inactive day can be considered as any day during which no movement-related messages were received from the VTU but control messages were received from the VTU (e.g., when the VTU was operating in a light sleep mode) and/or any day during which no messages were received from the VTU (e.g., when the VTU was operating in a deep sleep mode).

As another example, the feature can include information that identifies a number of days since installation of the VTU on the vehicle.

As another example, the feature can include information that identifies a type of a last message or set of last messages (e.g., a last three messages) received from the VTU prior to the VTU becoming inactive. In some implementations, the type of message can include, for example, a movement-related message, an engine status message, a diagnostic message, and/or the like the like.

As another example, the feature can include information that identifies a total number of vehicles of a vehicle fleet to which the VTU belongs.

As another example, the feature can include information that identifies whether a counter (e.g., a message counter) of the VTU was reset during a particular period of time (e.g., a last active day) prior to the VTU becoming inactive.

As another example, the feature can include information that identifies a total number and/or a percentage of active days of the VTU on which the VTU was reset, restarted, restored to a default configuration, and/or the like.

As another example, the feature can include information that identifies a duration of a light sleep mode as configured on the VTU and/or a duration of a deep sleep mode as configured on the VTU.

As another example, the feature can include information that identifies a total number and/or a percentage of messages received of each message type in a particular period of time (e.g., a last active day of the VTU, a last four active days of the VTU, and/or the like) prior to the VTU becoming inactive.

As another example, the feature can include statistical information associated with a voltage of a battery (e.g., a battery of the vehicle and/or a battery of the VTU), such as a maximum voltage on the battery on a given day (e.g., a last active day) and/or over a lifetime of the battery, a minimum voltage on the battery on a given day and/or over a lifetime of the battery, a standard deviation on a given day and/or over a lifetime of the battery, an average voltage on the battery on a given day and/or over a lifetime of the battery, and/or the like.

As another example, the feature can include information that indicates the presence of a point of interest (e.g., a repair facility) in proximity to (e.g., within a threshold distance of) a last known position of the VTU prior to the VTU becoming inactive.

As another example, the feature can include information that identifies a time, a date, a day of the week, a month, and/or the like, at which a last message was received from the VTU prior to the VTU becoming inactive.

As another example, the feature can include information that identifies a strength of a location services signal (e.g., a strength of a GPS signal) for locations identified in a last message or a set of last messages (e.g., a last three messages) received from the VTU prior to the VTU becoming inactive.

As another example, the feature can include information that identifies a delay time between a time at which a particular message (e.g., a last message) was transmitted by the VTU and a time at which the particular message was received (e.g., by the message data device).

As another example, the feature can include information that identifies a strength of a cellular signal (e.g., a strength of a GSM signal) at a time at which a last message or a set of last messages (e.g., a last three messages) were received from the VTU prior to the VTU becoming inactive.

As another example, the feature can include information indicative of a degree or sufficiency of expected network coverage in a last known location of the VTU prior to the VTU becoming inactive (e.g., in terms of distance to a closest cell tower).

As an example, the feature can include information that identifies a percentage of "heartbeat" messages sent by the VTU during a particular period of time (e.g., a period of four days prior to the VTU becoming inactive). In some implementations, an "heartbeat" message can include a message sent by the VTU while operating in a light sleep mode (e.g., when the vehicle is not in motion and/or the engine is not powered on).

As another example, the feature can include information that identifies a total number of messages received from the VTU during a particular period of time (e.g., a last active day) prior to the VTU becoming inactive.

As another example, the feature can include information indicating whether a last engine status signal, received prior to the VTU becoming inactive, indicated that an engine of the vehicle was powered off.

As another example, the feature can include information that identifies a number of days since a last engine status signal that indicated that the engine was powered off was received prior to the VTU becoming inactive.

As another example, the feature can include information that identifies a number and/or a percentage of inactivity periods with a duration that satisfies a threshold (e.g., at least four days) over a lifetime of the VTU.

As another example, the feature can include information that identifies whether the last message received from the VTU was an "heartbeat" message.

As another example, the feature can include information that identifies a number and/or a percentage of "heartbeat" messages received from the VTU during a particular time period (e.g., the last active day, the last active three days, a lifetime of the VTU, and/or the like).

As another example, the feature can include information that identifies a number of days since a most recent "heartbeat" message was received from the VTU.

As another example, the feature can include information that identifies a speed of the vehicle identified in a last message received from the VTU.

As another example, the feature can include information that identifies a number and/or a percentage of messages, received from the VTU during a particular period of time (e.g., a last active day, the last four active days, and/or the like the like), that indicated that no data connection was available.

As another example, the feature can include information that identifies a number and/or a percent of messages, received from the VTU during a particular period of time, that indicated the vehicle was idling (e.g., that the vehicle was not moving but that the engine was powered on).

As another example, the feature can include information that identifies a number and/or a percent of messages, received from the VTU during a particular period of time, that indicated that the ignition of the vehicle was powered on (e.g., that the ignition was powered on, but the engine was not powered on).

As another example, the feature can include information that identifies a number and/or a percent of messages, received from the VTU during a particular period of time, that indicated that an external power source was restored to the VTU and/or the vehicle.

As another example, the feature can include information that identifies a total number of messages during a particular period of time (e.g., a most recent week, a most recent month, and/or the like).

As another example, the feature can include information that identifies a number and/or a percent of messages, received from the VTU during a particular period of time, that indicated a poor location services signal quality at the location of the VTU.

As another example, the feature can include information that identifies a number and/or a percent of movement-related messages (e.g., messages indicating that the vehicle was in motion) received from the VTU during a particular period of time.

As another example, the feature can include information that identifies whether the last message or a last set of messages (e.g., a last three messages), received from the VTU prior to the VTU becoming inactive, included a movement-related message.

As another example, the feature can include information that identifies a number of location services satellites (e.g., GPS satellites) visible to the VTU at a time at which a last message was received from the VTU prior to the VTU becoming inactive.

As another example, the feature can include information that identifies a mean or an average number of messages per day, received from the VTU during a particular period of time (e.g., a lifetime of the VTU), that indicated that the engine of the vehicle was powered on.

As another example, the feature can include information that identifies proximity of the VTU to a border (e.g., a national border, a state border, and/or the like) at a time at which the VTU transmitted a last message prior to the VTU becoming inactive.

Notably, the above described features are provided as examples, and other features can be determined based on message data (e.g., historical message data) and/or environmental data (e.g., historical environmental data) for inclusion in a feature vector.

As indicated above, a feature vector associated with a given VTU (e.g., a historical feature vector) can include one or more of the above described features. When generating the inactivity classification model, the classification platform can determine a set of features, to be included in a historical feature vector associated with a historically inactive VTU, based on historical message data associated with the historically inactive VTU and/or historical environmental data associated with the historically inactive VTU.

In this way, the classification platform can generate the inactivity classification model that receives, as an input, a feature vector associated with an inactive VTU and provides, as an output, an inactivity classification, associated with the inactive VTU.

FIGS. 1B and 1C described an example implementation associated with using the inactivity classification model generated in the manner described above. In FIGS. 1B and 1C, the classification platform uses the inactivity classification model to classify an inactive VTU (e.g., VTU 5) as an ANR or as a normal inactive unit. In some implementations, the classification platform can use the inactivity classification model to classify an inactive VTU that was included in the set of historically inactive VTUs based on which the inactivity classification model was generated (e.g., a VTU for which new message data and/or new environmental data is available). Additionally, or alternatively, the classification platform can use the inactivity classification model to classify an inactive VTU that was not included in the set of historically inactive VTUs.

As shown in FIG. 1B, and by reference number 122, the VTU (e.g., VTU 5 configured on vehicle 5) transmits messages to the message data device. In some implementations, a given message transmitted by a given VTU can include location information associated with a vehicle, activity and status information associated with the vehicle, diagnostic information associated with the VTU, and/or one or more other types of information, as described above.

As shown by reference number 124, the classification platform receives the message data, associated with the VTU, from the message data device. For example, the classification platform can be configured such that the classification platform periodically (e.g., once a day, once a week, and/or the like) requests message data for VTUs from which at least one message was received during a particular period of time (e.g., a most recent seven days), and can receive the message data from the message data device in response to the request. In some implementations, the message data received by the classification platform can include message data received from the VTU during a particular period of time (e.g., a most recent 14 days, a most recent month, and/or the like). In some implementations, the period of time can be configurable and/or selectable on the classification platform.

In some implementations, as shown by reference number 126, the classification platform can identify the VTU as an inactive VTU based on the message data associated with the VTU. For example, the classification platform can determine whether a length of an inactive period of the VTU (e.g., an amount of time since a most recent message was received from the VTU) satisfies a threshold (e.g., one day, three days, a week, and/or the like). Here, if the length of the inactive period satisfies the threshold (e.g., if a message has not been received from the VTU for an amount of time that meets or exceeds the threshold), then the classification platform can identify the given VTU as an inactive VTU (e.g., a currently inactive VTU). Conversely, if the length of the inactive period does not satisfy the threshold, then the classification platform may not identify the VTU as an inactive VTU. For the purposes of FIGS. 1B and 1C, the classification platform identifies the VTU (e.g., VTU 5) as an inactive VTU based on the message data associated with the VTU.

As further shown in FIG. 1B, and by reference number 128, the classification platform can determine environmental data associated with the VTU. As described above, the environmental data can include information that describes a characteristic of an environment in proximity to (e.g., within a threshold distance) a location from which an inactive VTU transmitted before becoming inactive. For example, the environmental data can include information indicating the presence of a point of interest included in an environment of the VTU, information that describes network coverage conditions in the environment of the VTU, information that describes location service coverage conditions in the environment of the VTU, and/or the like, as described above.

In some implementations, as shown in FIG. 1B, the classification platform can determine the environmental data based on information provided by the one or more environmental data devices that store or have access to environmental data (e.g., in a manner similar to that described above in association with FIG. 1A).

As shown by reference number 130, the classification platform can compute a feature vector, associated with the VTU, based on the message data and on the environmental data associated with the VTU. The feature vector computed by the classification platform can include one or more features that can be used as input to the inactivity classification model. For example, the classification platform can generate the inactivity classification model such that feature vectors that use a particular set of features are to be provided as an input to the inactivity classification model. Here, the classification platform can compute the feature vector, associated with the VTU, such that the feature vector includes the particular set of features.

In some implementations, the classification platform can compute the feature vector, associated with the VTU, based on the message data and the environmental data associated with the VTU. In some implementations, as described above, the feature vector can include information associated with an activity history associated with the VTU, an inactivity history associated with the VTU, a message type history associated with the VTU, a reset history of the VTU, an age of the VTU, a voltage statistic associated with the VTU, a most recent message provided by the VTU (e.g., a last message sent before the VTU became inactive), a proximity of a point of interest to the VTU, a cellular signal quality associated with the VTU, a location service signal quality associated with the VTU, and/or the like. In some implementations, the feature vector can include one or more of the features described above in association with FIG. 1A. In some implementations, a manner in which the classification platform computes the feature vector, associated with the VTU, is similar to that which the classification platform computes feature vectors for historically inactive VTUs, as described above in association with FIG. 1A.

As shown in FIG. 1C, and by reference number 132, the classification platform can determine the inactivity classification model. For example, the classification platform can generate and store the inactivity classification model, as described above. Here, the classification platform can determine the inactivity classification model based on the retrieving the inactivity classification model from storage on the classification platform.

As shown by reference number 134, the classification platform can determine, using the inactivity classification model, an inactivity classification associated with the VTU. For example, as illustrated in FIG. 1C, the classification platform can provide the feature vector, associated with the VTU, as an input to the inactivity classification model and can receive, as an output of the inactivity classification model, an inactivity classification indicating that the VTU has been classified as an ANR or that the VTU has been classified as a normal inactive unit. In this way, the classification platform can identify an inactive VTU, and classify the inactive VTU as an ANR or as a normal inactive unit.

In some implementations, as shown by reference number 136, the classification platform can cause an inactivity action to be performed based on the inactivity classification.

For example, if the inactivity classification indicates that the VTU is an ANR, then the classification platform can cause a notification to be provided to a user device (e.g., in order to automatically notify a fleet operator that an ANR has been identified).

As another example, if the inactivity classification indicates that the VTU is an ANR, then the classification platform can cause a work order, associated with repairing the VTU, to be generated and/or provided (e.g., in order to automatically initiate a process associated with repairing the VTU).

As another example, if the inactivity classification indicates that the VTU is an ANR, then the classification platform can cause the vehicle, associated with the VTU, to be taken out of a fleet pool (e.g., in order to prevent the vehicle from being used while the VTU is in disrepair).

As another example, if the inactivity classification indicates that the VTU is a normal inactive unit, then the classification platform can cause a notification to be provided to a user device (e.g., in order to automatically notify a fleet operator that an ANR has been identified).

As another example, if the inactivity classification indicates that the VTU is a normal inactive unit, then the classification platform can cause a notification to be provided to a user device (e.g., in order to automatically notify a fleet operator that the inactive VTU does not need repair).

In this way, the classification platform can generate an inactivity classification model, determine an inactivity classification associated with an inactive VTU using the inactivity classification model, and cause an action to be (automatically) performed based on the inactivity classification.

As indicated above, FIGS. 1A-1C are provided merely as examples. Other examples can differ from what was described with regard to FIGS. 1A-1C. For example, in some implementations, periodic (e.g., daily) forwarding of information associated with newly detected ANR VTUs (e.g., to a team of support specialists) can be implemented in order to validate diagnoses by the classification platform and, possibly, in order to identify large scale VTU issues as soon as possible.

In some implementations, the classification platform can receive feedback associated with an inactivity classification that indicates that the VTU is an ANR, and can initiate the action and/or update the inactivity classification model based on the feedback. For example, the classification platform can provide, for display via a user interface of a user device, information associated with the VTU that was classified as an ANR, and can receive feedback (e.g., user input) associated with the VTU in order to allow an action to be automatically initiated and/or in order to improve the inactivity classification model.

FIGS. 2A, 2B, 3A, 3B, 4A, 4B, 5A, and 5B are diagrams of example user interfaces via which the classification platform can receive feedback associated with an inactivity classification of a VTU.

In the example shown in FIGS. 2A and 2B, the user can provide input confirming that the vehicle has been driven during a given period of time (e.g., a last seven days) and that the VTU is an ANR. In this case, as indicated in FIGS. 2A and 2B, the user can directly request a technician to repair the VTU. This feedback confirms the accuracy of the inactivity classification of the inactivity classification model and, as a result, the classification platform can store data that can be used to create a feature vector for inclusion in a training set associated with training the inactivity classification model.

Figure 3B:
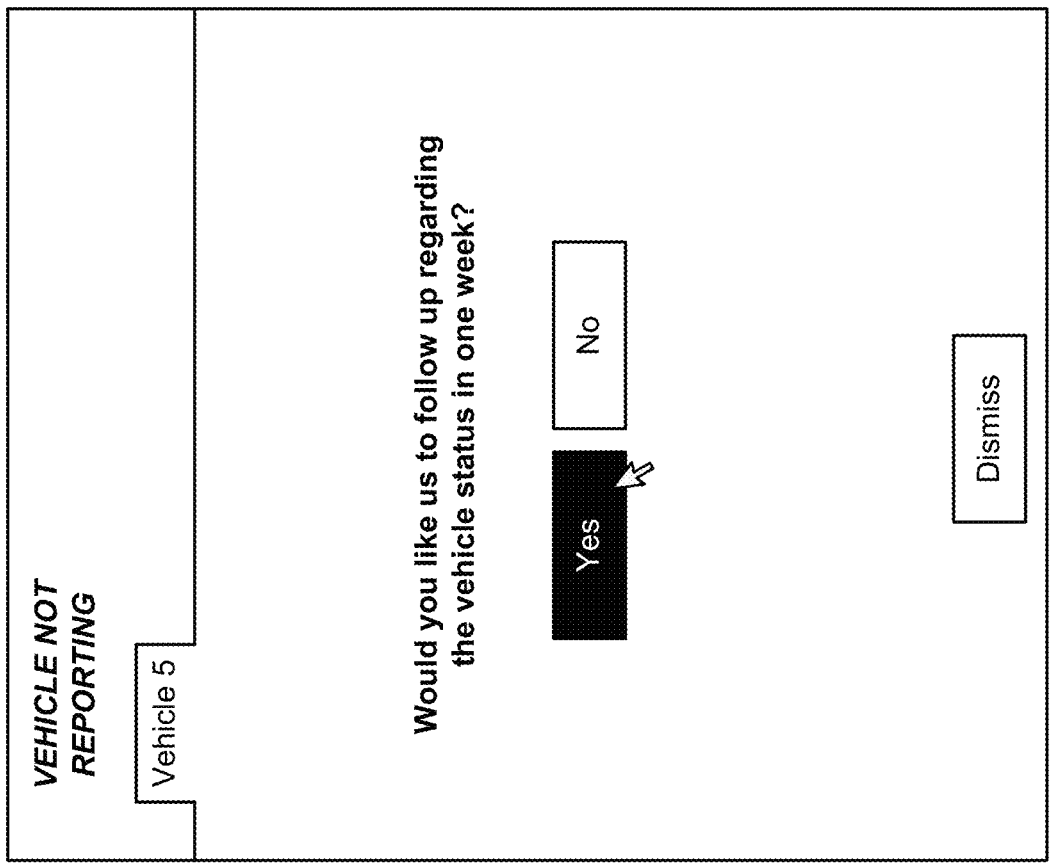
Figure 3A:
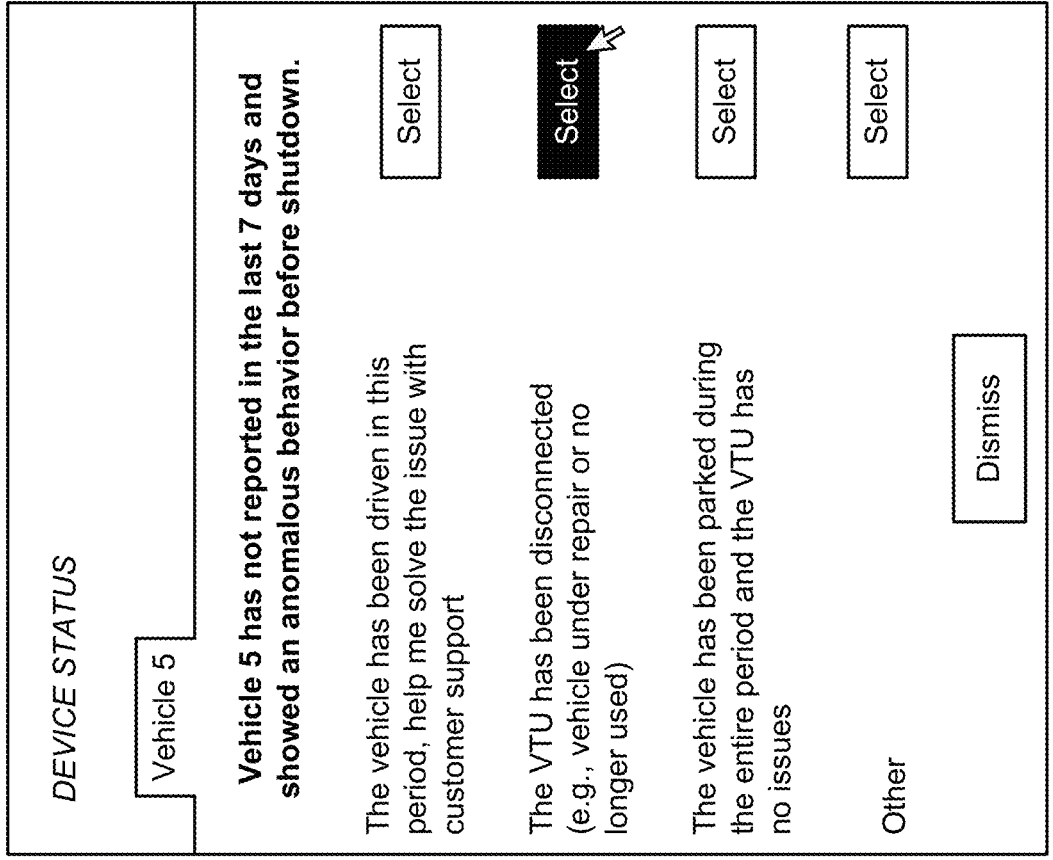

In the example shown in FIGS. 3A and 3B, the VTU is classified as an ANR, but the user is aware of the inactivity of the VTU (e.g., having knowledge that the VTU has been manually unplugged because the vehicle is under repair). Again, this feedback confirms the accuracy of the inactivity classification of the inactivity classification model and, as a result, the classification platform can store data that can be used to create a feature vector for inclusion in a training set associated with training the inactivity classification model.

As further shown, in some cases, the classification platform can cause an action to be initiated such that the status of the VTU is revisited after a period of time (e.g., one week).

Figure 4A:
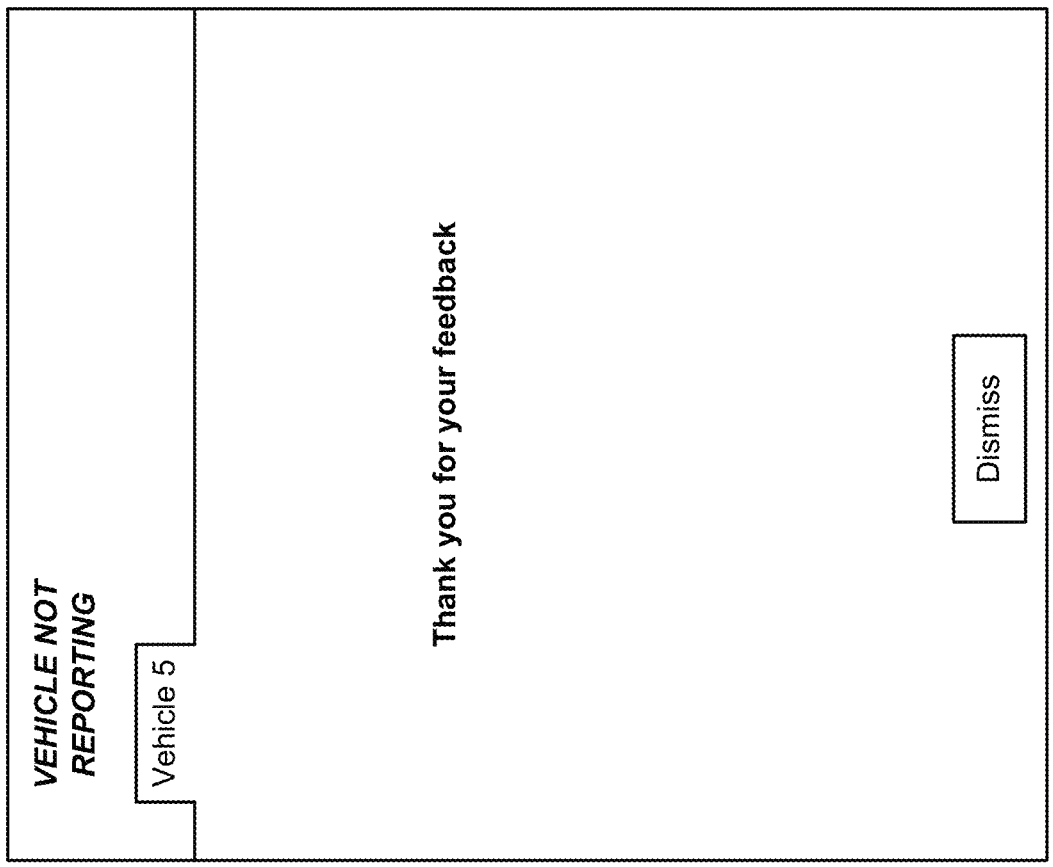
Figure 4B:
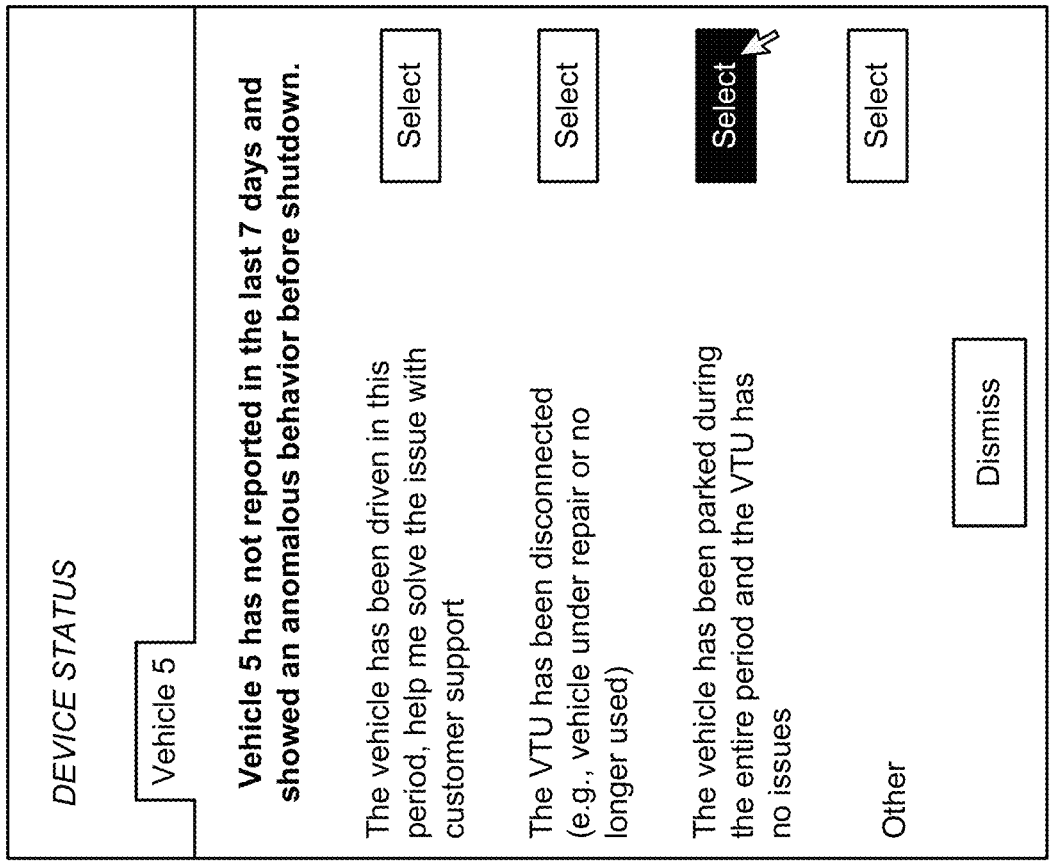

In the example shown in FIGS. 4A and 4B, the VTU is classified as an ANR, but the user indicates that the vehicle has been parked and that the VTU was not disconnected. In this example, this feedback does not confirm the accuracy of the inactivity classification of the inactivity classification model and, as a result, the classification platform can update and/or retrain the inactivity classification model based on revising the inactivity classification.

In the example shown in FIGS. 5A and 5B, the VTU is classified as an ANR, but the user indicates that the anomalous behavior has a different origin other than those specified. Thus, as shown, the user can be permitted to provide a description (e.g., a textual description) of the issue via an input element (e.g., a text box) of the user interface. In some implementations, the classification platform can use this feedback in order to refine and improve the inactivity classification model by taking into account previously unforeseen scenarios.

As indicated above, FIGS. 2A, 2B, 3A, 3B, 4A, 4B, 5A, and 5B are provided merely as examples. Other examples can differ from what was described with regard to FIGS. 2A, 2B, 3A, 3B, 4A, 4B, 5A, and 5B.

Figure 6:
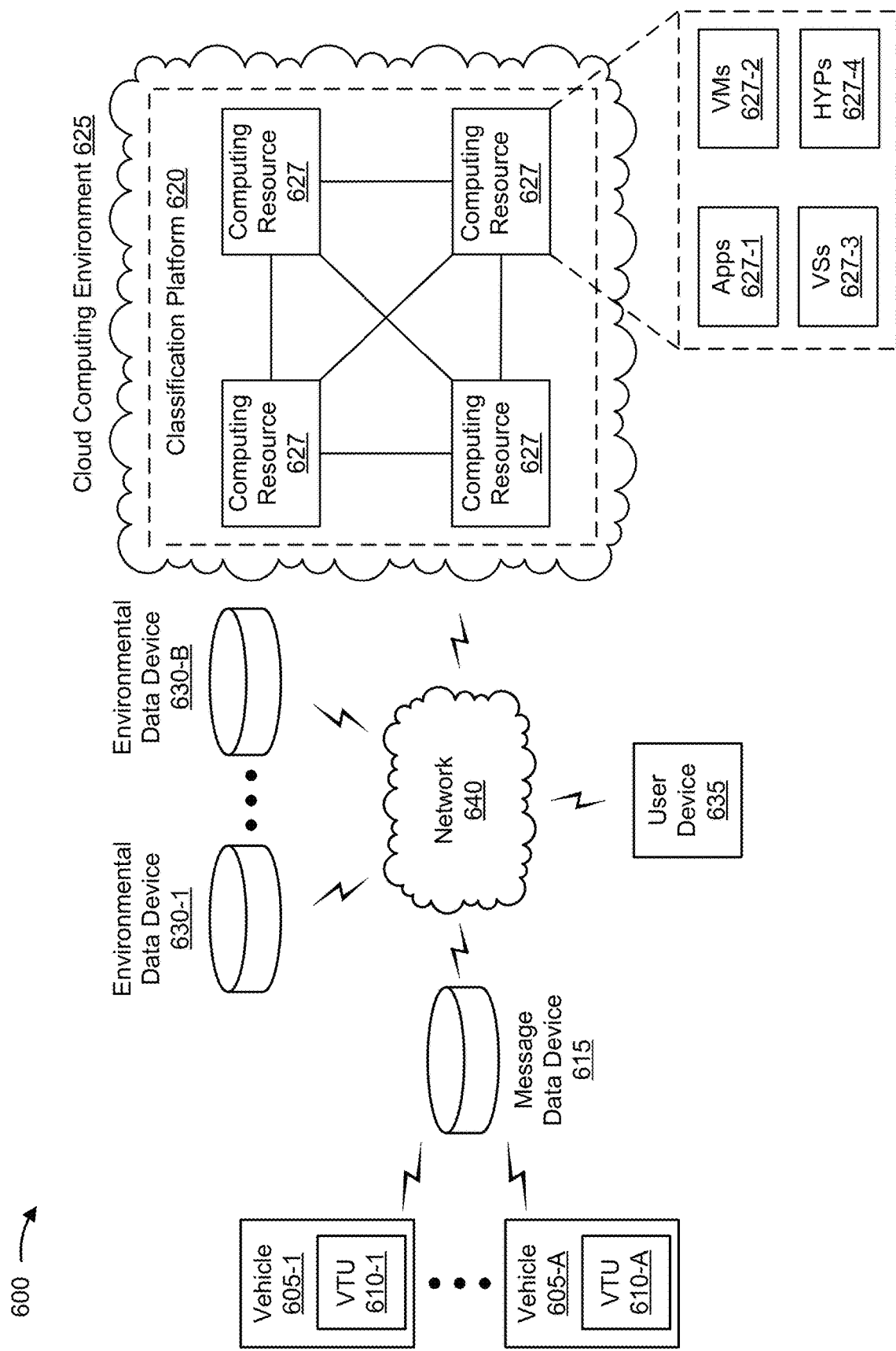
FIG. 6 is a diagram of an example environment in which systems and/or methods described herein can be implemented.

FIG. 6 is a diagram of an example environment 600 in which systems and/or methods, described herein, can be implemented. As shown in FIG. 6, environment 600 can include a set of vehicles 605 (e.g., vehicle 605-1 through vehicle 605-A (A≥1)) and a corresponding set of VTUs 610 (e.g., VTU 610-1 through VTU 610-A), each configured on a respective one of the set of vehicles 605. As further shown, environment 600 can include a message data device 615, a classification platform 620 hosted in a cloud computing environment 625, a set of environmental data devices 630 (e.g., environmental data device 630-1 through environmental data device 630-B (B≥1), a user device 635, and a network 640. Devices of environment 600 can interconnect via wired connections, wireless connections, or a combination of wired and wireless connections.

Vehicle 605 includes a vehicle on which VTU 610 can be configured (e.g., installed, mounted, housed, and/or the like). For example, vehicle 605 can include an automobile (e.g., a car, a truck, and/or the like), a water-based vehicle (e.g., a boat, a barge, a jet ski, and/or the like), an aircraft (e.g., an airplane, a helicopter, a drone), a machine (e.g., construction equipment, mining equipment, and/or the like), and/or another type of machine or apparatus for which tracking can be desired.

VTU 610 includes one or more devices capable of determining, generating, processing, and/or providing a message associated with tracking vehicle 605, as described herein. In some implementations, VTU 610 is capable of transmitting a message that includes information that identifies a current location of vehicle 605, activity information associated with vehicle 605, status information associated with vehicle 605 and/or VTU 610, diagnostic information associated with vehicle 605 and/or VTU 610, and/or the like, as described herein.

Message data device 615 includes one or more devices capable of receiving, storing, processing, and/or providing messages received from VTUs 610, as described herein. For example, message data device 615 can include a server or a group of servers.

Classification platform 620 includes one or more devices capable of receiving, storing, generating, processing, and/or providing information associated with an inactivity classification of VTU 610, as described here. For example, classification platform 620 can include a server or group of servers. In some implementations, classification platform can use an inactivity classification model in order to determine an inactivity classification associated with VTU 610, as described herein. In some implementations, classification platform 620 can be capable of generating the inactivity classification model, as described herein.

As shown in FIG. 6, in some implementations, classification platform can be hosted in a cloud computing environment 625. For example, as shown in FIG. 6, in some implementations, classification platform 620 is implemented by computing resources 627 of cloud computing environment 625. Notably, while implementations described herein describe classification platform 620 as being hosted in cloud computing environment 625, in some implementations, classification platform 620 can be non-cloud-based or can be partially cloud-based.

Cloud computing environment 625 includes an environment that delivers computing as a service, whereby shared resources, services, and/or the like, can be provided to classification platform 620. Cloud computing environment 625 can provide computation, software, data access, storage, and/or other services that do not require end-user knowledge of a physical location and configuration of a system and/or a device that delivers the services. As shown, cloud computing environment 625 can include a set of computing resources 627.

Computing resource 627 includes one or more personal computers, workstation computers, server devices, or another type of computation and/or communication device. In some implementations, computing resource 627 can host classification platform 620. The cloud resources can include compute instances executing in computing resource 627, storage devices provided in computing resource 627, data transfer devices provided by computing resource 627, etc. In some implementations, computing resource 627 can communicate with other computing resources 627 via wired connections, wireless connections, or a combination of wired and wireless connections.

As further shown in FIG. 6, computing resource 627 can include a group of cloud resources, such as one or more applications ("APPs") 627-1, one or more virtual machines ("VMs") 627-2, virtualized storage ("VSs") 627-3, one or more hypervisors ("HYPs") 627-4, or the like.

Application 627-1 includes one or more software applications that can be provided to or accessed by user device E05. Application 627-1 can eliminate a need to install and execute the software applications on user device E05. For example, application 627-1 can include software associated with classification platform 620 and/or any other software capable of being provided via cloud computing environment 625. In some implementations, one application 627-1 can send/receive information to/from one or more other applications 627-1, via virtual machine 627-2.

Virtual machine 627-2 includes a software implementation of a machine (e.g., a computer) that executes programs like a physical machine. Virtual machine 627-2 can be either a system virtual machine or a process virtual machine, depending upon use and degree of correspondence to any real machine by virtual machine 627-2. A system virtual machine can provide a complete system platform that supports execution of a complete operating system ("OS"). A process virtual machine can execute a single program and can support a single process. In some implementations, virtual machine 627-2 can execute on behalf of a user (e.g., user device E05), and can manage infrastructure of cloud computing environment 625, such as data management, synchronization, or long-duration data transfers.

Virtualized storage 627-3 includes one or more storage systems and/or one or more devices that use virtualization techniques within the storage systems or devices of computing resource 627. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 627-4 provides hardware virtualization techniques that allow multiple operating systems (e.g., "guest operating systems") to execute concurrently on a host computer, such as computing resource 627. Hypervisor 627-4 can present a virtual operating platform to the guest operating systems and can manage the execution of the guest operating systems. Multiple instances of a variety of operating systems can share virtualized hardware resources.

Environmental data device 630 includes one or more devices capable of receiving, storing, processing, and/or providing environmental data associated with VTUs 610, as described herein. For example, environmental data device 630 can include a server or a group of servers.

User device 635 includes one or more devices capable of receiving, generating, storing, processing, and/or providing information associated with VTU 610, as described herein. For example, user device 635 can include a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device.

Network 640 includes one or more wired and/or wireless networks. For example, network 640 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there can be additional devices and/or networks, fewer devices and/or networks, different devices and/or networks, or differently arranged devices and/or networks than those shown in FIG. 6. Furthermore, two or more devices shown in FIG. 6 can be implemented within a single device, or a single device shown in FIG. 6 can be implemented as multiple, distributed devices. Additionally, or alternatively, a set of devices (e.g., one or more devices) of environment 600 can perform one or more functions described as being performed by another set of devices of environment 600.

Figure 7:
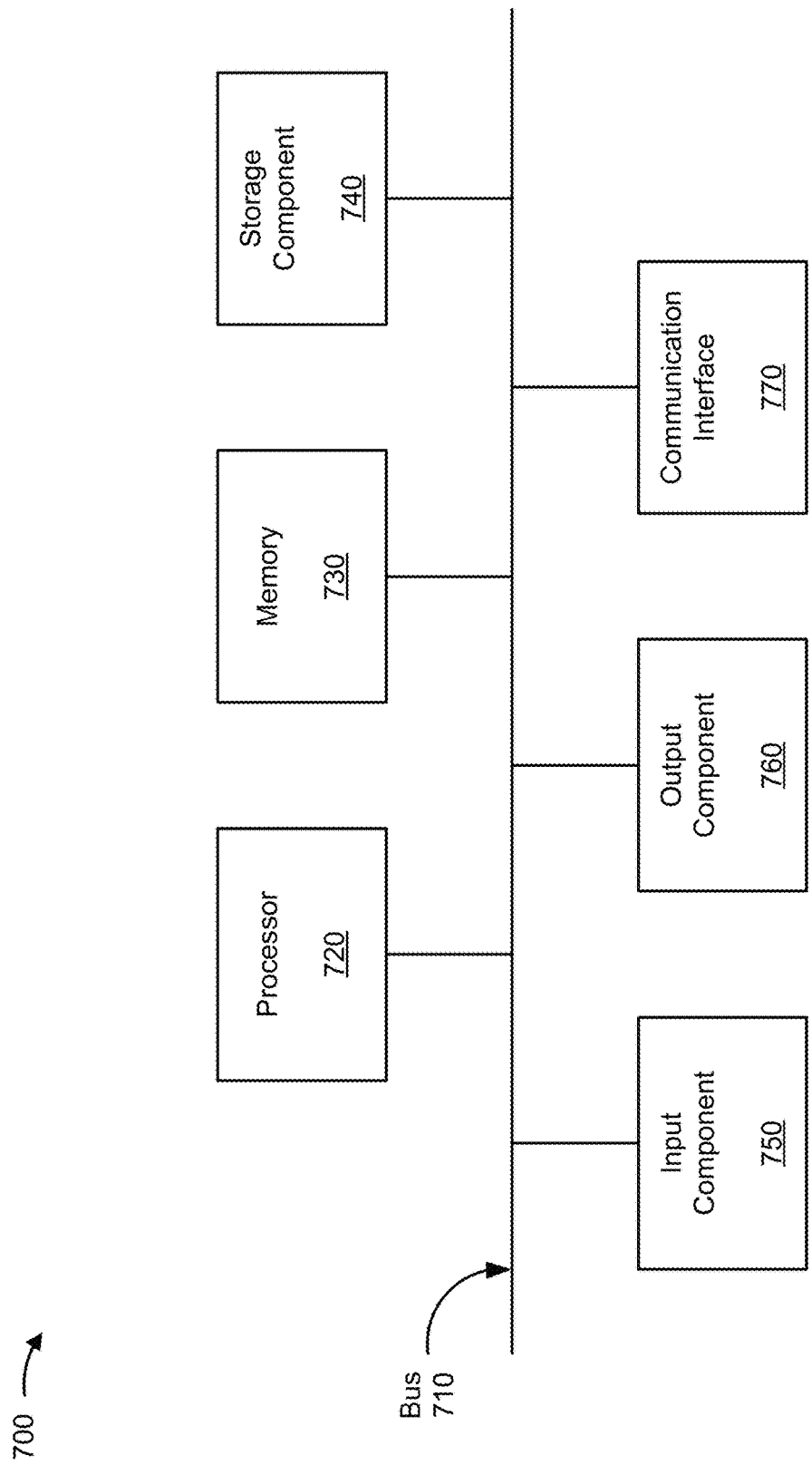
FIG. 7 is a diagram of example components of one or more devices of FIG. 6.

FIG. 7 is a diagram of example components of a device 700. Device 700 can correspond to VTU 610, message data device 615, classification platform 620, computing resource 627, environmental data device 630, and/or user device 635. In some implementations, VTU 610, message data device 615, classification platform 620, computing resource 627, environmental data device 630, and/or user device 635 can include one or more devices 700 and/or one or more components of device 700. As shown in FIG. 7, device 700 can include a bus 710, a processor 720, a memory 730, a storage component 740, an input component 750, an output component 760, and a communication interface 770.

Bus 710 includes a component that permits communication among the components of device 700. Processor 720 is implemented in hardware, firmware, or a combination of hardware and software. Processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes one or more memories, such as a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits device 700 to receive information, such as via user input (e.g., a touch screen display, a keyboard, a keypad, a mouse, a button, a switch, and/or a microphone). Additionally, or alternatively, input component 750 can include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 can permit device 700 to receive information from another device and/or provide information to another device. For example, communication interface 770 can include an Ethernet interface, an optical interface, a coaxial interface, an infrared interface, a radio frequency (RF) interface, a universal serial bus (USB) interface, a wireless local area network interface, a cellular network interface, or the like.

Device 700 can perform one or more processes described herein. Device 700 can perform these processes based on processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions can be read into memory 730 and/or storage component 740 from another computer-readable medium or from another device via communication interface 770. When executed, software instructions stored in memory 730 and/or storage component 740 can cause processor 720 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 can include additional components, fewer components, different components, or differently arranged components than those shown in FIG. 7. Additionally, or alternatively, a set of components (e.g., one or more components) of device 700 can perform one or more functions described as being performed by another set of components of device 700.

Figure 8:
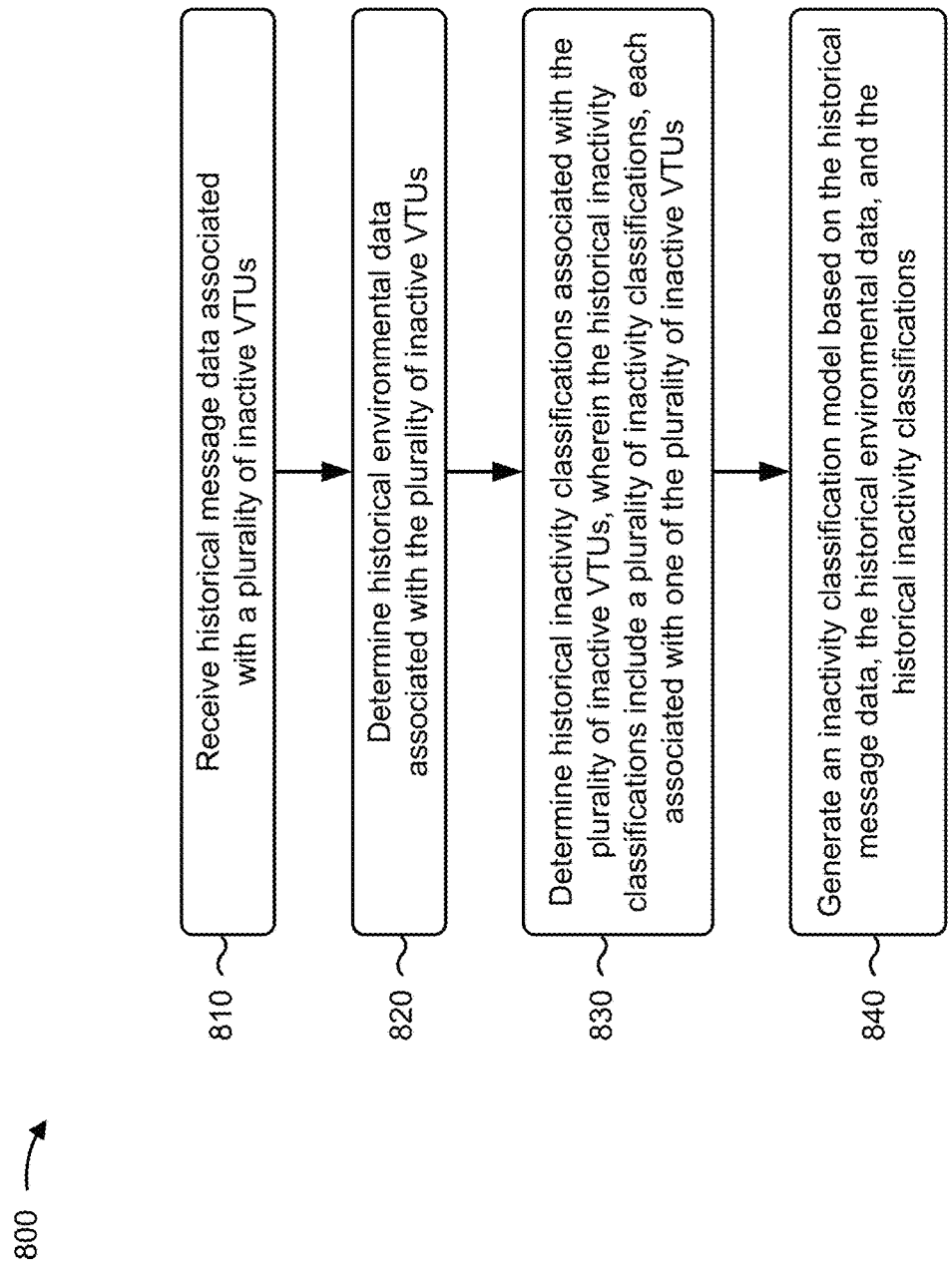
FIG. 8 is a flow chart of an example process for generating an inactivity classification model associated with classifying inactive VTUs.

FIG. 8 is a flow chart of an example process 800 for generating an inactivity classification model associated with classifying inactive VTUs. In some implementations, one or more process blocks of FIG. 8 can be performed by a classification platform (e.g., classification platform 620). In some implementations, one or more process blocks of FIG. 8 can be performed by another device or a group of devices separate from or including the classification platform, such as one or more other devices of environment 600.

As shown in FIG. 8, process 800 can include receiving historical message data associated with plurality of inactive VTUs (block 810). For example, the classification platform (e.g., using processor 720, input component 750, communication interface 770, and/or the like) can receive historical message data associated with a plurality of inactive VTUs (e.g., a plurality of inactive VTUs 610), as described above.

As further shown in FIG. 8, process 800 can include determining historical environmental data associated with the plurality of inactive VTUs (block 820). For example, the classification platform (e.g., using processor 720, memory 730, storage component 740, input component 750, communication interface 770, and/or the like) can determine historical environmental data associated with the plurality of inactive VTUs, as described above.

As further shown in FIG. 8, process 800 can include determining historical inactivity classifications associated with the plurality of inactive VTUs (block 830). For example, the classification platform (e.g., using processor 720, memory 730, storage component 740, input component 750, communication interface 770, and/or the like) can determine historical inactivity classifications associated with the plurality of inactive VTUs, as described above. In some implementations, the historical inactivity classifications include a plurality of inactivity classifications, each associated with one of the plurality of inactive VTUs, as described above.

As further shown in FIG. 8, process 800 can include generating an inactivity classification model based on the historical message data, the historical environmental data, and the historical inactivity classifications (block 840). For example, the classification platform (e.g., using processor 720, memory 730, storage component 740, and/or the like) can generate an inactivity classification model based on the historical message data, the historical environmental data, and the historical inactivity classifications, as described above.

Process 800 can include additional implementations, such as any single implementation or any combination of implementations in connection with one or more other processes described elsewhere herein.

Although FIG. 8 shows example blocks of process 800, in some implementations, process 800 can include additional blocks, fewer blocks, different blocks, or differently arranged blocks than those depicted in FIG. 8. Additionally, or alternatively, two or more of the blocks of process 800 can be performed in parallel.

FIG. 9 is a flow chart of an example process 900 for determining an inactivity classification, associated with an inactive VTU, using an inactivity classification model. In some implementations, one or more process blocks of FIG. 9 can be performed by a classification platform (e.g., classification platform 620). In some implementations, one or more process blocks of FIG. 9 can be performed by another device or a group of devices separate from or including the classification platform, such as one or more other devices of environment 600.

As shown in FIG. 9, process 900 can include receiving message data associated with a VTU (block 910). For example, the classification platform (e.g., using processor 720, input component 750, communication interface 770, and/or the like) can receive message data associated with a VTU (e.g., VTU 610), as described above.

As further shown in FIG. 9, process 900 can include identifying whether the VTU is an inactive VTU (block 920). For example, the classification platform (e.g., using processor 720, memory 730, storage component 740, input component 750, communication interface 770, and/or the like) can identify whether the VTU is an inactive VTU, as described above.

As further shown in FIG. 9, if the VTU is identified as an inactive VTU (block 920—YES) then process 900 can include computing a feature vector, associated with the VTU, based on the message data and on environmental data associated with the VTU (block 930). For example, the classification platform (e.g., using processor 720, memory 730, storage component 740, and/or the like) can compute a feature vector, associated with the VTU, based on the message data and on environmental data associated with the VTU, as described above. In some implementations, the feature vector can be computed based on identifying the VTU as an inactive VTU, as described above.

As further shown, if the VTU is not identified as an inactive VTU (block 920—NO) then the classification platform can await receipt of additional message data (i.e., process 900 can return to block 910). In some implementations, the classification platform can await receipt of additional message data associated with the VTU in order to allow the classification platform to identify whether the VTU has subsequently become inactive. Additionally, or alternatively, the classification platform can receive message data associated with another VTU (e.g., another VTU 610) in order to allow the classification platform to identify whether the other VTU is inactive.

As further shown in FIG. 9, process 900 can include determining, using an inactivity classification model and the feature vector, an inactivity classification associated with the VTU (block 940). For example, the classification platform (e.g., using processor 720, memory 730, storage component 740, input component 750, communication interface 770, and/or the like) can determine, using an inactivity classification model and the feature vector, an inactivity classification associated with the VTU, as described above.

As further shown in FIG. 9, process 900 can include causing an inactivity action to be performed based on the inactivity classification (block 950). For example, the classification platform (e.g., using processor 720, memory 730, storage component 740, output component 760, communication interface 770, and/or the like) can cause an inactivity action to be performed based on the inactivity classification, as described above.

Process 900 can include additional implementations, such as any single implementation or any combination of implementations described below and/or in connection with one or more other processes described elsewhere herein.

In some implementations, the inactivity classification can indicate that the VTU has been classified as an anomalous non-reporting unit or that the VTU has been classified as a normal inactive unit.

In some implementations, the classification platform can determine that a length of an inactive period of the VTU satisfies a threshold. Here, the classification platform, when identifying the VTU as an inactive VTU, can identify the VTU as an inactive VTU based on determining that the length of the inactive period of the VTU satisfies the threshold.

In some implementations, the environmental data includes information associated with at least one of a point of interest included in the environment of the VTU; cellular network coverage conditions in the environment of the VTU; or location service coverage conditions in the environment of the VTU.

In some implementations, the feature vector includes information associated with at least one of: an activity history associated with the VTU; an inactivity history associated with the VTU; a message type history associated with the VTU; a reset history of the VTU; an age of the VTU; a voltage statistic associated with the VTU; a most recent message provided by the VTU; proximity of a point of interest to the VTU; a cellular signal quality associated with the VTU; or a location service signal quality associated with the VTU.

In some implementations, the classification platform can receive historical message data associated with a plurality of inactive VTUs, determine historical environmental data associated with the plurality of inactive VTUs, and determine historical inactivity classifications associated with the plurality of inactive VTUs. Here, the historical inactivity classifications can include a plurality of inactivity classifications, each associated with one of the plurality of inactive VTUs. In some implementations, the classification platform can generate the inactivity classification model based on the historical message data, the historical environmental data, and the historical inactivity classifications.

In some implementations, the classification platform can receive feedback associated with the inactivity classification, and update the inactivity classification model based on the feedback.

Although FIG. 9 shows example blocks of process 900, in some implementations, process 900 can include additional blocks, fewer blocks, different blocks, or differently arranged blocks than those depicted in FIG. 9. Additionally, or alternatively, two or more of the blocks of process 900 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, message data associated with a vehicle tracking unit (VTU);
   identifying, by the device and based on the message data, the VTU as an inactive VTU;
   computing, by the device, a feature vector, associated with the VTU, based on the message data and on environmental data associated with the VTU,
      wherein the feature vector is computed based on identifying the VTU as an inactive VTU, and
      wherein the environmental data includes information associated with at least one of:
         a point of interest included in an environment of the VTU, or
         location service coverage conditions in the environment of the VTU;
   determining, by the device and using an inactivity classification model, an inactivity classification associated with the VTU,
      wherein the inactivity classification is determined based on providing the feature vector, associated with the VTU, as an input to the inactivity classification model,
      wherein the inactivity classification indicates that the VTU has been classified as an anomalous non-reporting unit or that the VTU has been classified as a normal inactive unit, and
      wherein the inactivity classification model comprises a machine learning model trained, using historical feature vectors associated with respective historically inactive VTUs, to:
         receive, as input, the feature vector, and
         provide, as output, the inactivity classification; and
   causing, by the device, an inactivity action to be performed based on the inactivity classification.

2. The method of claim 1, further comprising:
   determining that a length of an inactive period of the VTU satisfies a threshold; and
   wherein identifying the VTU as an inactive VTU comprises:
      identifying the VTU as an inactive VTU based on determining that the length of the inactive period of the VTU satisfies the threshold.

3. The method of claim 1, wherein the feature vector includes information associated with at least one of:
   an activity history associated with the VTU;
   an inactivity history associated with the VTU;
   a message type history associated with the VTU;
   a reset history of the VTU;
   an age of the VTU;
   a voltage statistic associated with the VTU;
   a most recent message provided by the VTU;
   proximity of the point of interest to the VTU;
   a cellular signal quality associated with the VTU; or
   a location service signal quality associated with the VTU.

4. The method of claim 1, further comprising:
receiving historical message data associated with a plurality of inactive VTUs;
determining historical environmental data associated with the plurality of inactive VTUs;
determining historical inactivity classifications associated with the plurality of inactive VTUs,
wherein the historical inactivity classifications include a plurality of inactivity classifications, each associated with one of the plurality of inactive VTUs; and
training the inactivity classification model based on the historical message data, the historical environmental data, and the historical inactivity classifications.

5. The method of claim 1, further comprising:
receiving feedback associated with the inactivity classification; and
updating the inactivity classification model based on the feedback.

6. The method of claim 1, wherein the environmental data further includes information associated with cellular network coverage conditions in the environment of the VTU.

7. The method of claim 1, wherein the inactivity action comprises at least one of:
cause a notification to be provided to a user device associated with the VTU,
cause a work order, associated with repairing the VTU, to be generated,
cause a vehicle, associated with the VTU, to be removed from a fleet pool of active fleet vehicles.

8. A device, comprising:
one or more memories; and
one or more processors, communicatively coupled to the one or more memories, to:
receive message data associated with a vehicle tracking unit (VTU);
identify, based on the message data, the VTU as an inactive VTU;
compute a feature vector, associated with the VTU, based on the message data and environmental data associated with the VTU,
wherein the feature vector is computed based on identifying the VTU as an inactive VTU, and
wherein the environmental data includes information associated with at least one of:
a point of interest included in an environment of the VTU, or
location service coverage conditions in the environment of the VTU;
determine, using an inactivity classification model, an inactivity classification associated with the VTU,
wherein the inactivity classification is determined based on providing the feature vector, associated with the VTU, as an input to the inactivity classification model,
wherein the inactivity classification indicates that the VTU has been classified as an anomalous non-reporting unit or that the VTU has been classified as a normal inactive unit, and
wherein the inactivity classification model comprises a machine learning model trained, using historical feature vectors associated with respective historically inactive VTUs, to:
receive, as input, the feature vector, and
provide, as output, the inactivity classification; and
cause an inactivity action to be performed based on the inactivity classification.

9. The device of claim 8, wherein the one or more processors are further to:
determine that a length of an inactive period of the VTU satisfies a threshold; and
wherein the one or more processors, when identifying the VTU as an inactive VTU, are to:
identify the VTU as an inactive VTU based on determining that the length of the inactive period of the VTU satisfies the threshold.

10. The device of claim 8, wherein the environmental data further includes information associated with cellular network coverage conditions in the environment of the VTU.

11. The device of claim 8, wherein the feature vector includes information associated with at least one of:
an activity history associated with the VTU;
an inactivity history associated with the VTU;
a message type history associated with the VTU;
a reset history of the VTU;
an age of the VTU;
a voltage statistic associated with the VTU;
a last message provided by the VTU;
proximity of the point of interest to the VTU;
a cellular signal quality associated with the VTU; or
a location service signal quality associated with the VTU.

12. The device of claim 8, wherein the one or more processors are further to:
receive historical message data associated with a plurality of inactive VTUs;
determine historical environmental data associated with the plurality of inactive VTUs;
determine historical inactivity classifications associated with the plurality of inactive VTUs,
wherein the historical inactivity classifications include a plurality of inactivity classifications, each associated with one of the plurality of inactive VTUs; and
train the inactivity classification model based on the historical message data, the historical environmental data, and the historical inactivity classifications.

13. The device of claim 8, wherein the one or more processors are further to:
receive feedback associated with the inactivity classification; and
update the inactivity classification model based on the feedback.

14. The device of claim 8, wherein the inactivity action comprises at least one of:
cause a notification to be provided to a user device associated with the VTU,
cause a work order, associated with repairing the VTU, to be generated,
cause a vehicle, associated with the VTU, to be removed from a fleet pool of active fleet vehicles.

15. A non-transitory computer-readable medium storing instructions, the instructions comprising:
one or more instructions that, when executed by one or more processors, cause the one or more processors to:
receive message data associated with a vehicle tracking unit (VTU);
identify, based on the message data, the VTU as an inactive VTU;
compute a feature vector, associated with the VTU, based on the message data and environmental data associated with the VTU,
wherein the feature vector is computed based on identifying the VTU as an inactive VTU, and
wherein the environmental data includes information associated with at least one of:

a point of interest included in an environment of the VTU, or location service coverage conditions in the environment of the VTU;

determine, using an inactivity classification model, an inactivity classification associated with the VTU, wherein the inactivity classification is determined based on providing the feature vector, associated with the VTU, as an input to the inactivity classification model, wherein the inactivity classification indicates that the VTU has been classified as an anomalous non-reporting unit or that the VTU has been classified as a normal inactive unit, and wherein the inactivity classification model comprises a machine learning model trained, using historical feature vectors associated with respective historically inactive VTUs, to:

receive, as input, the feature vector, and provide, as output, the inactivity classification; and cause an inactivity action to be performed based on the inactivity classification.

16. The non-transitory computer-readable medium of claim 15, wherein the one or more instructions, when executed by the one or more processors, further cause the one or more processors to:

determine that a length of an inactive period of the VTU satisfies a threshold; and wherein the one or more instructions, that cause the one or more processors to identify the VTU as an inactive VTU, cause the one or more processors to:

identify the VTU as an inactive VTU based on determining that the length of the inactive period of the VTU satisfies the threshold.

17. The non-transitory computer-readable medium of claim 15, wherein the environmental data further includes information associated with cellular network coverage conditions in the environment of the VTU.

18. The non-transitory computer-readable medium of claim 15, wherein the feature vector includes information associated with at least one of:

an activity history associated with the VTU;

an inactivity history associated with the VTU;

a message type history associated with the VTU;

a reset history of the VTU;

an age of the VTU;

a voltage statistic associated with the VTU;

a last message provided by the VTU;

proximity of the point of interest to the VTU;

a cellular signal quality associated with the VTU; or a location service signal quality associated with the VTU.

19. The non-transitory computer-readable medium of claim 15, wherein the one or more instructions, when executed by the one or more processors, further cause the one or more processors to:

receive historical message data associated with a plurality of inactive VTUs;

determine historical environmental data associated with the plurality of inactive VTUs;

determine historical inactivity classifications associated with the plurality of inactive VTUs, wherein the historical inactivity classifications include a plurality of inactivity classifications, each associated with one of the plurality of inactive VTUs; and train the inactivity classification model based on the historical message data, the historical environmental data, and the historical inactivity classifications.

20. The non-transitory computer-readable medium of claim 15, wherein the one or more instructions, when executed by the one or more processors, further cause the one or more processors to:

receive feedback associated with the inactivity classification; and update the inactivity classification model based on the feedback.

* * * * *